United States Patent [19]

Cooling et al.

[11] Patent Number: 4,892,153

[45] Date of Patent: Jan. 9, 1990

[54] SOD HARVESTER

[75] Inventors: Eugene D. Cooling; Timothy M. Cooling, both of Rockford, Ill.

[73] Assignee: Joe Cooling & Sons Inc., Rockford, Ill.

[21] Appl. No.: 179,476

[22] Filed: Apr. 8, 1988

[51] Int. Cl.⁴ .............................................. A01B 45/04
[52] U.S. Cl. ..................................... 172/20; 414/911; 172/54.5
[58] Field of Search ......................... 172/19, 20, 54.5; 414/911, 24.5, 24.6

[56] References Cited

U.S. PATENT DOCUMENTS

| | | | |
|---|---|---|---|
| 2,778,292 | 1/1957 | Kavan | 172/19 |
| 3,053,328 | 9/1962 | Geipel | 172/19 |
| 3,235,011 | 2/1966 | Pasinski et al. | 172/19 |
| 3,653,448 | 4/1972 | Morrill | 172/19 |
| 3,747,686 | 7/1973 | Beck | 172/20 |
| 3,754,815 | 7/1988 | Brouwer et al. | 172/19 X |
| 3,807,504 | 4/1974 | Nunes, Jr. | 172/19 X |
| 3,812,918 | 5/1974 | Beck | 172/19 |
| 4,621,696 | 11/1986 | Brouwer | 172/20 |
| 4,632,192 | 12/1986 | Hooks | 172/19 |

FOREIGN PATENT DOCUMENTS

| | | | |
|---|---|---|---|
| 0726426 | 1/1966 | Canada | 172/19 |
| 0221745 | 5/1987 | European Pat. Off. | 172/19 |

Primary Examiner—Randolph A. Reese
Assistant Examiner—Jeffrey L. Thompson
Attorney, Agent, or Firm—Leydig, Voit & Mayer

[57] ABSTRACT

A sod harvester in which two transversely spaced cutterheads form sod into two side-by-side strips and slice the strips away from the underlying earth. The strips then are wound into rolls on a roller carried by the rear of the harvester. A power-driven endless belt engages the strips to initially wrap the strips around the roller and then assists in winding the strips into rolls of comparatively large diameter. A magazine on the harvester carries a supply of rollers and includes an escapement which may be actuated to drop a roller to the ground after sod has been wound on a preceding roller.

8 Claims, 4 Drawing Sheets

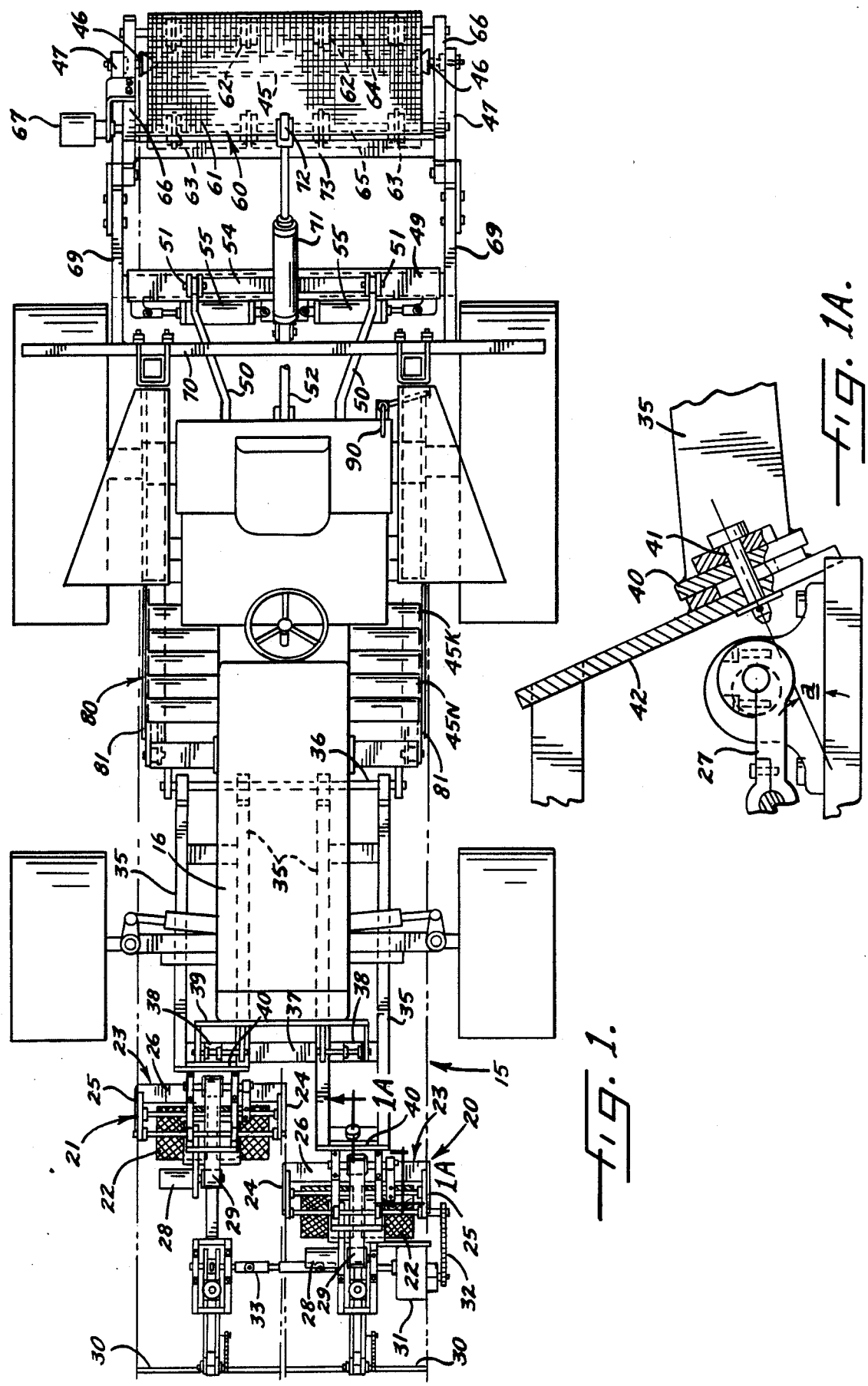

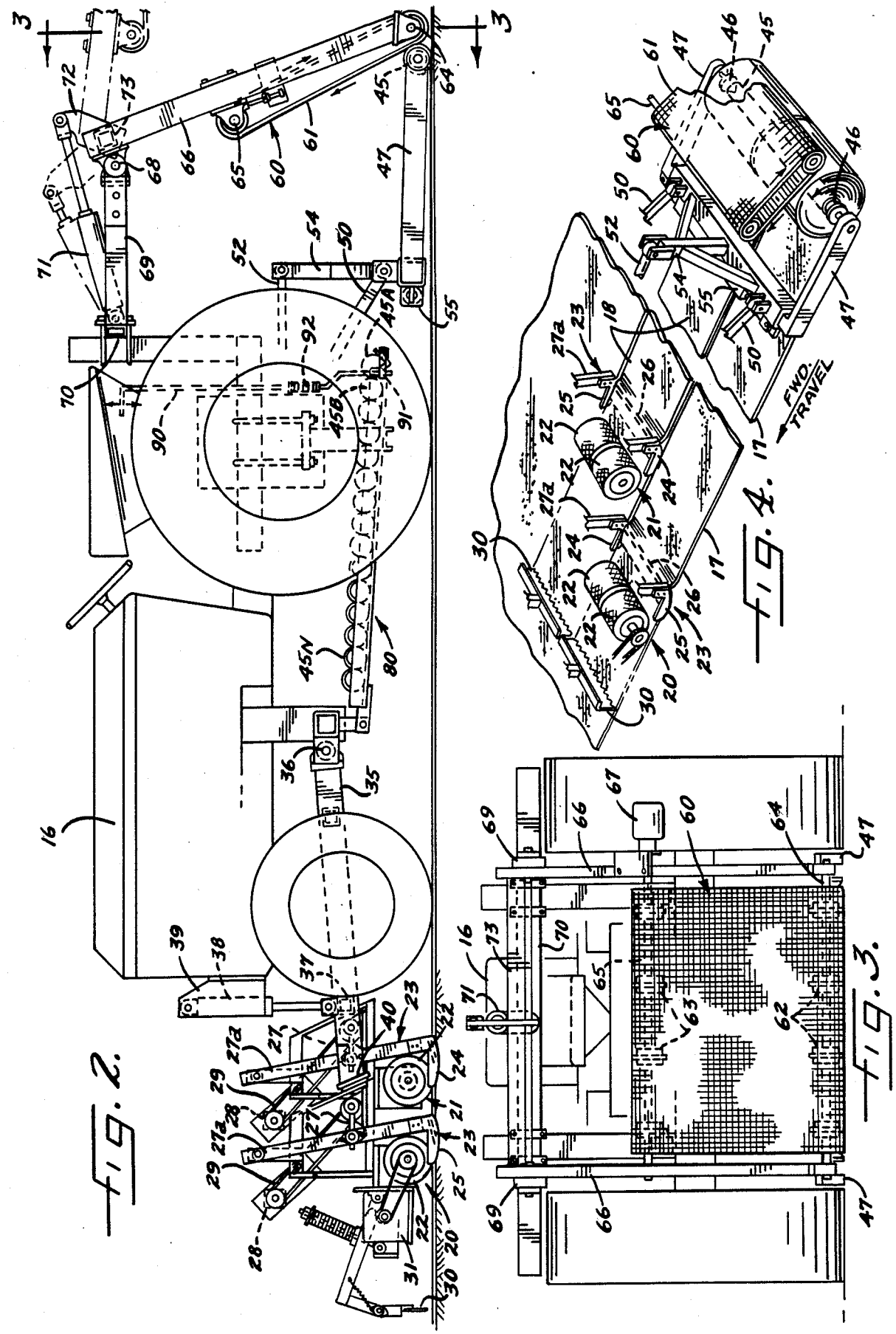

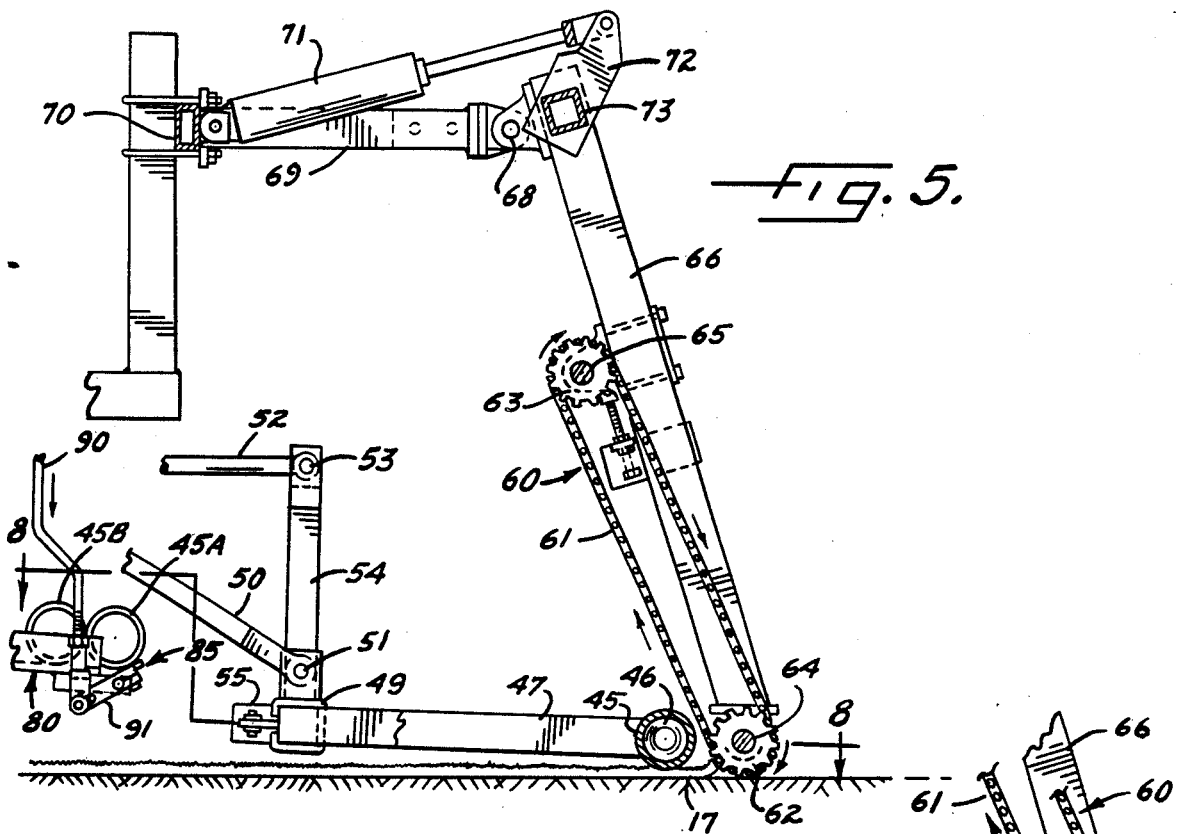
Fig. 5.
Fig. 6.
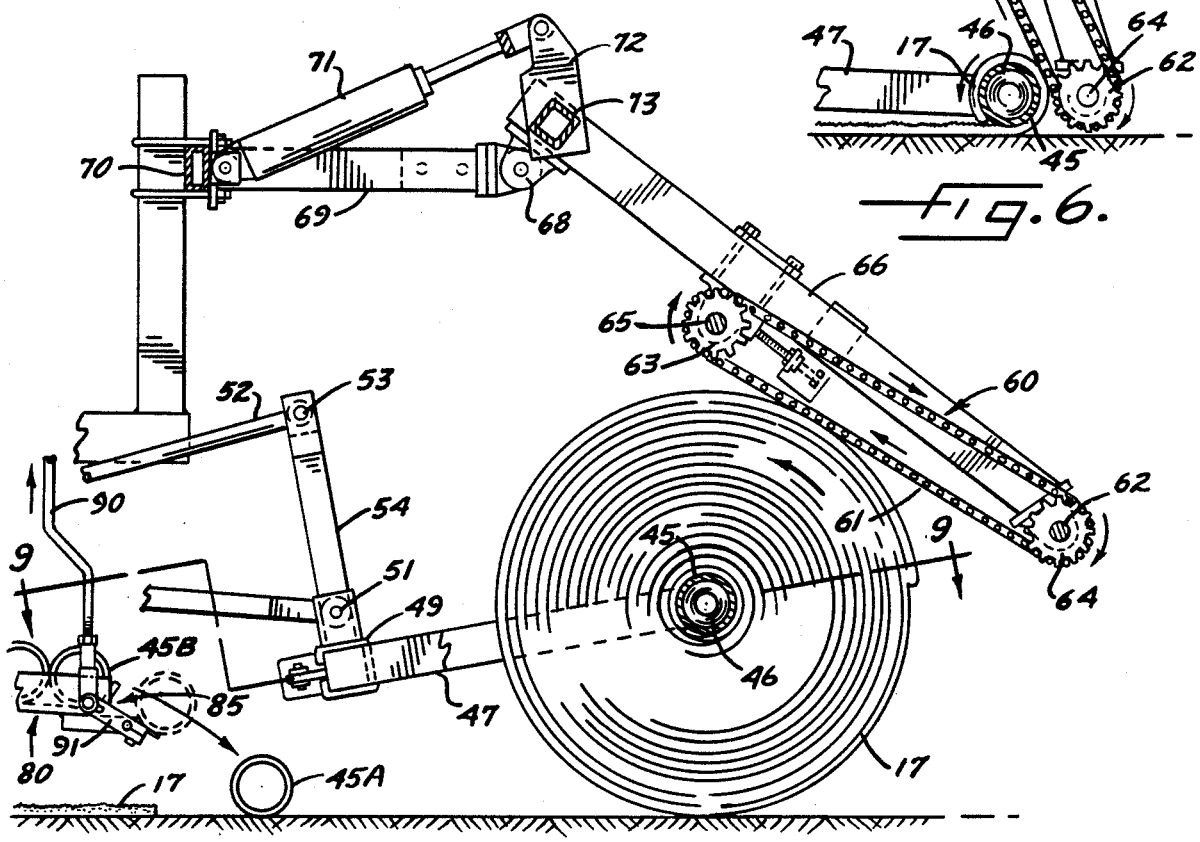
Fig. 7.

SOD HARVESTER

BACKGROUND OF THE INVENTION

This invention relates to a sod harvester for use on a sod farm for cutting sod into strips and for slicing the strip from the ground.

A conventional sod harvester includes a cutterhead adapted to be mounted on the front of a vehicle such as a tractor. The cutterhead comprises a blade unit having two transversely spaced side blades and having a bottom blade which extends transversely between the side blades. As the tractor travels forwardly, the blade unit is oscillated back and forth. During such oscillation, the side blades cut the sod into an elongated strip while the bottom blade moves beneath the sod and slices the strip away from the ground. At predetermined increments, a transversely extending cut-off blade is shifted downwardly and acts to sever the end of one strip from the end of the next strip and thereby divide the sod into strips of predetermined length.

Recently, it has become customary to cut the sod into relatively long strips (e.g., 45 feet) to facilitate handling and subsequent laying of the sod. After being cut, the strips are wound into large rolls for transport to the site where the sod is to be laid. A strip which is 45 feet long forms a roll which is about 30 inches in diameter.

Winding of the sod into a roll is achieved by means of a rotatable ground-engaging roller attached to the rear of the tractor. The rear end portion of the sod strip is manually wrapped around the roller in order to start the roll. Then, as the tractor travels forwardly, the strip winds upon itself to form the roll. When a complete roll has been formed, the roll and the winding roller are removed from the harvester and another roller is installed to handle the next strip of sod.

SUMMARY OF THE INVENTION

One of the general aims of the present invention is to provide a new and improved sod harvester which requires less manual labor and which is capable of handling sod rolls of larger diameter than has been possible heretofore.

A more detailed object of the invention is to achieve the foregoing by equipping the harvester with a unique power-assist which starts winding of the sod on the roller and which helps roll the sod so as to enable comparatively large-diameter rolls to be formed.

Another important object of the invention is to provide a sod harvester in which the winding rolls may be installed on and removed from the harvester in a substantially automatic manner and without need of manual labor.

A related object is to provide a sod harvester having a magazine for carrying a supply of rollers, having means for causing the rollers to drop from the magazine one at a time and having means for automatically picking up a dropped roller and then for automatically releasing the roller after a strip of sod has been wound thereon.

Still another object of the invention is to provide a sod harvester having ganged cutterheads enabling two side-by-side strips of sod to be cut simultaneously.

The invention also resides in novel means for mounting the cutterheads to enable the heads to float across undulating terrain and to accommodate turning of the tractor.

These and other objects and advantages of the invention will become more apparent from the following detailed description when taken in conjunction with the accompanying drawings.

BRIEF DESCRIPTION OF THE DRAWINGS

FIG. 1 is a top plan view of a tractor equipped with a new and improved sod harvester incorporating the unique features of the present invention.

FIG. 1A is an enlarged fragmentary cross-section taken substantially along the line 1A—1A of FIG. 1.

FIG. 2 is a side elevational view of the tractor and the sod harvestor.

FIG. 3 is a rear elevational view of the tractor and the sod harvester as seen substantially along the line 3—3 of FIG. 2.

FIG. 4 is a perspective view showing many of the principal elements of the sod harvester.

FIG. 5 is an enlarged view of certain parts illustrated in FIG. 2 and shows the parts as positioned just prior to the starting of rolling of the sod.

FIG. 6 is a fragmentary view of parts illustrated in FIG. 5 and shows initial winding of the sod on a roller.

FIG. 7 is a view similar to FIG. 5 but shows the entire strip of sod wound on the roller.

DETAILED DESCRIPTION OF THE PREFERRED EMBODIMENT

Figure 8:
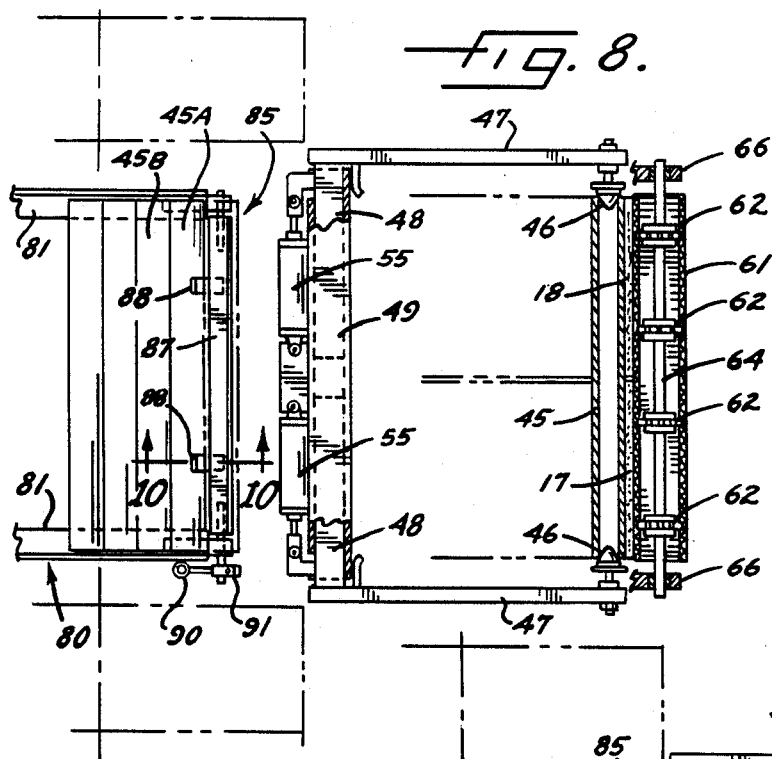
FIG. 8 is a fragmentary cross-section taken substantially along the line 8—8 of FIG. 5 and shows the roller being held in position to wind the sod.

For purposes of illustration, the present invention has been shown in the drawings as incorporated in a harvester 15 for use on a sod farm. The harvester serves to cut virgin sod into strips and to slice the strips away from the underlying earth so as to enable the strips to be wound into rolls for transport to a site which is to be landscaped. The harvester is adapted to be attached to a tractor 16 or other self-propelled vehicle.

Advantageously, the harvester 15 is adapted to simultaneously cut from the ground two side-by-side strips 17 and 18 (FIG. 4) of sod each having a substantial width of about 22 inches. For this purpose, the harvester includes two cutterheads 20 and 21 (FIG. 1) mounted on the front of the tractor 16 and adapted to form and cut the strips 17 and 18, respectively. The two cutterheads are virtually identical and each comprises a pair of transversely spaced ground-engaging rollers 22. Trailing each roller is a blade unit 23 having inboard and outboard side cutters or blades 24 and 25 which are spaced transversely from one another. When the tractor 16 travels forwardly, the blade units 23 are oscillated back and forth along the line of travel to cause the side blades to cut the underlying sod into the two side-by-side strips 17 and 18. Each blade unit also includes a bottom cutter or blade 26 (FIG. 4) which extends between the side blades. During oscillation of the blade unit, each bottom blade slices between the sod and the underlying earth to free the sod from the earth.

The blade units 23 are oscillated by crank mechanisms 27 (FIG. 2) connected to upstanding arms 27a which form part of the cutterheads 20 and 21. Each cutterhead includes a rotary hydraulic motor 28 (FIG. 1) which is operably connected to the crank mechanism 27 by an endless belt 29.

In addition to the blade unit 23, each cutterhead 20, 21 includes a transversely extending cut-off blade 30 (FIGS. 1 and 2) which precedes the blade unit, the cut-off blade being supported to pivot upwardly and downwardly about a transversely extending axis. Each cut-off blade is normally held upwardly in an inactive position and is periodically pivoted downwardly to an active position to cut transversely between the rear end of one sod strip and the forward end of the next strip and thereby separate the strips from one another. Pivoting of the cut-off blade 30 of the cutterhead 20 is effected by a conventional linear measuring unit 31 which is connected to the roller 22 of the head by a chain 32. Each time the head 20 travels through a predetermined distance, the measuring unit 31 acts in a conventional manner to cause the cut-off blade 30 of the head to pivot downwardly momentarily and cut through the sod. Downward pivoting of the cut-off blade 30 of the head 20 is effected by a transversely extending drive shaft 33 (FIG. 2) connected to the unit 31 and operably connected to the cut-off blade in a conventional manner.

As shown most clearly in FIG. 1, the cutterhead 21 is spaced both transversely and rearwardly from the cutterhead 20. Also, as shown most clearly in FIGS. 1 and 4, the inboard side blade 24 of the cutterhead 21 is alined or virtually alined with the inboard side blade 24 of the cutterhead 20. As a result of such positioning, the two heads are capable of cutting two side-by-side sod strips 17 and 18 at the same time while leaving either no sod or only a very narrow width of sod between the two strips. Thus, approximately 44 inches of sod may be harvested in a single pass of the tractor 16.

The cutterheads 20 and 21 are adapted to be lifted from an active position shown in FIG. 2 to a raised inactive position permitting rapid movement of the tractor 16 from place-to-place. For this purpose, each head is carried on the forward end portions of a pair of arms 35 (FIGS. 1 and 2) whose rear end portions are pivotally supported by a transversely extending and horizontal shaft 36 located beneath the tractor 16 between the front and rear wheels thereof. Between their ends, the arms are connected to one another by a transversely extending bar 37. Two reciprocating hydraulic actuators 38 are connected between the bar and a bracket 39 on the front of the tractor 16. When the actuators are operated in a direction to retract their rods, the arms 35 are pivoted upwardly about the shaft 36 so as to raise the cutterheads 20 and 21 to inactive positions in which the rollers 22 and the blade units 23 are clear of the ground.

Importantly, each of the cutterheads 20 and 21 is supported to float relative to the arms 35 to allow the cutterheads to accommodate undulating terrain to accommodate steering of the tractor 16. To these ends, a plate 40 (FIG. 1A) is connected to and extends across the forward ends of the arms 35 of each pair. A pivot bolt 41 extends through each plate and is connected to a frame member 42 of the associated cutterhead. Each pivot bolt lies along an axis which slants downwardly upon pressing forwardly and which is inclined relative to horizontal at an angle a. Herein, the angle a is 30 degrees although the angle could be in the range of between 20 and 40 degrees. By virtue of the angle of the pivot bolts 41, the cutterheads 20 and 21 may rock as necessary to follow the contour of the earth. In addition, the cutterheads may pivot and stay on the ground when the tractor is steered. If the angle a is substantially greater than 40 degrees, the heads will not follow the terrain in a satisfactory manner. If the angle a is substantially less than 20 degrees, one end or the other of each cutterhead will lift off of the ground when the tractor is steered.

Figure 9:
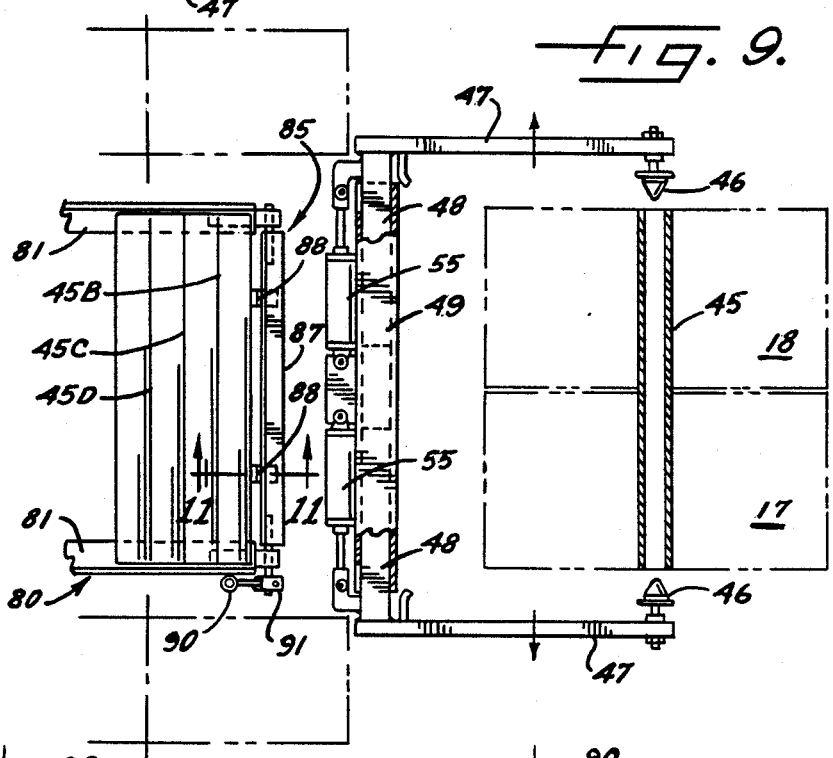
FIG. 9 is a view similar to FIG. 8 but shows the sod wound on the roller and shows the roller released from the harvester.

The two strips 17 and 18 of sod which are cut from the ground are wound around a roller 45 (FIGS. 8 and 9) at the rear of the tractor 16. The roller is tubular and is supported by transversely spaced cones 46 which are rotatably mounted on the rear end portions of arms 47. Each arm is connected to a bar 48 of rectangular cross-section and is slidably received in a sleeve 49 which also is of rectangular cross-section. The lower links 50 (FIG. 5) of the three-point hitch of the tractor 16 are pivotally connected at 51 to the sleeve while the upper link 52 of the hitch is pivotally connected at 53 to an upstanding mast 54 on the sleeve.

The cones 46 are adapted to be shifted between active positions (FIG. 8) in which the cones support the roller 45 and inactive positions (FIG. 9) in which the cones release the roller. For this purpose, two reciprocating hydraulic actuators 55 (FIG. 8) are supported by the sleeve 49 and have their rods operably connected to the bars 48. When the rods are extended, the arms 47 are spread apart to pull the cones 46 out of the roller 45. Retraction of the actuator rods causes the arms 47 to move toward one another to effect insertion of the cones into the end portions of the roller.

In accorance with an important aspect of the present invention, provision is made of a power-assist unit 60 (FIGS. 4 to 7) to help wind the sod strips 17 and 18 on the roller 45 both initially and during forward travel of the tractor 16. Herein, the power-assist unit comprises an endless wire mesh belt 61 having a width approximately equal to the combined width of the two sod strips 17 and 18. The belt is tensioned between and is trained around a plurality of lower tranversely spaced sprockets 62 and a plurality of upper transversely spaced sprockets 63. The sprockets 62 and 63 are secured to transversely extending shafts 64 and 65, respectively, which are supported by two transversely spaced arms 66. A rotary hydraulic motor 67 (FIGS. 1 and 3) is connected to the upper shaft 65 and is operable to rotate the upper sprockets 63 in a clockwise direction to cause the belt 61 to travel in the direction indicated by the arrows in FIG. 7.

As shown in FIGS. 1 and 5, the upper end portions of the arms 66 are pivotally connected at 68 to a pair of transversely spaced bars 69 fastened rigidly to a crossbar 70 on the rear of the tractor 16. A reciprocating hydraulic actuator 71 is connected between the crossbar and a bracket 72 fixed to a bar 73 extending transversely between the upper end portions of the arms 66.

When the rod of the actuator 71 is retracted, the arms 66 of the power-assist unit 60 are swung upwardly until the belt 61 is located in a generally horizontal inactive position as shown in phantom lines in FIG. 2. Upon extension of the rod of the actuator 71, the arms 66 are swung downwardly to locate the lower end portion of the belt 61 in proximity to the rear side of the roller 45.

After two strips 17 and 18 of sod have been cut, the tractor 16 is moved forwardly until the roller 45 is positioned over the rear end portions of the strips as shown in FIG. 5. The power-assist unit 60 then is lowered to place the lower end portion of the belt 61 just behind the extreme rear edges of the strips. The hydraulic motor 67 then is started to cause the belt to wind the rear end portions of the strips around the roller 45 (see FIG. 6). Once the strips have been wound partially around the roller, the tractor is moved forwardly while driving of the belt continues. As a result of the roller 45 moving forwardly and rotating counterclockwise and as a result of the action of the belt 61, the sod strips are wound into rolls around the roller. During such winding, the hydraulic actuator (not shown) for the three-point hitch of the tractor and the hydraulic lift actuator 71 of the power-assist unit 60 are placed in neutral or "float". As a result, the hitch permits the roller 45 and the arms 47 to move upwardly as the diameter of the sod rolls increase (see FIG. 7). At the same time, the actuator 71 permits the arms 66 to swing counterclockwise about the pivots 68 so that the belt 61 may swing upwardly and accommodate the increasing diameter of the rolls.

By virtue of the power-assist unit 60, there is no necessity of manually winding the end portions of the strips 17 and 18 around the roller 45. Moreover, sod rolls of comparatively large diameter may be wound on the roller 45. By way of example, the present power-assist unit 60 may easily wind a sod strip having a length of 80 feet into a roll having a diameter of about 42 inches. Because of its ability to form large rolls, the harvester simplifies handling, transport and laying of the sod.

According to another important aspect of the invention, rollers 45A, 45B, etc. are supplied automatically to the arms 47 to avoid the need of the operator leaving the tractor 16 and manually placing a roller between the arms each time a new sod roll is to be formed. This is achieved through the provision of a magazine or rack 80 (FIGS. 2 and 8) located beneath the tractor and adapted to hold several (e.g., 15) rollers. In the present instance, the magazine is formed simply by a pair of longitudinally extending and transversely spaced rails 81 (FIGS. 9 and 10) which are suitably secured beneath the tractor 16 in such a position that the rails slope downwardly upon progressing rearwardly. The rear ends of the rails are located just ahead of the sleeve 49.

Figures 10, 11:
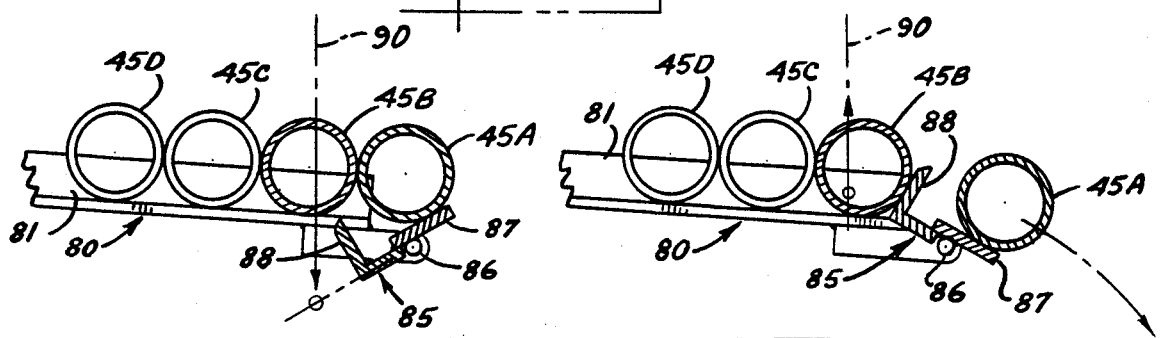
FIG. 10 is an enlarged fragmentary cross-section taken substantially along the line 10—10 of FIG. 8 and shows the rollers being held in the magazine.
FIG. 11 is an enlarged fragmentary cross-section taken substantially along the line 11—11 of FIG. 9 and shows one of the rollers being released from the magazine.

As shown in FIGS. 1 and 2, the supply of rollers 45A, 45B, etc. span the rails 81 of the magazine 80. Each time the winding of one roll of sod is completed, the rear roller in the magazine is released therefrom and is allowed to fall to the ground. To hold the rollers but allow selective release thereof, an escapement 85 (FIG. 10) is pivotally mounted at 86 on the rear end of the magazine. In the present instance, the escapement comprises a plate 87 extending transversely across the rear of the magazine and welded to a tongue 88 which extends at right angles to the plate. When the escapement 85 is positioned as shown in FIG. 10, the plate 87 is inclined upwardly and rearwardly at an angle of about 45 degrees and engages the rear roller 45A in the rack 80 to hold the roller in the rack. When the escapement is rocked clockwise through approximately 90 degrees, the plate 87 slopes downwardly and rearwardly as shown in FIG. 11 and guides the rear roller 45A off of the magazine and toward the ground. At the same time, the tongue 88 swings upwardly to a position behind the next roller 45B and prevents that roller from leaving the magazine. When the escapement is returned counterclockwise from the position shown in FIG. 11 to the position shown in FIG. 10, the plate 87 catches the next roller 45B and holds the same until the escapement is again triggered.

The escapement 85 is controlled by means of a manually actuatable rod 90 (FIG. 2) whose upper end is located near the seat of the tractor 16. The lower end portion of the rod is connected pivotally to a short link 91 (FIG. 7) which, in turn, is rigid with the escapement. A coil spring 92 (FIG. 2) urges the rod 90 downwardly and normally causes the escapement to be positioned as shown in FIG. 10. When the rod is manually pulled upwardly, the escapement 85 is pivoted clockwise to the position shown in FIG. 11 in order to release the rearmost roller from the magazine.

With the foregoing arrangement, the tractor 16 is pulled forwardly until the rearmost roller 45B in the magazine 80 is positioned just over the rear end portions of the next pair of side-by-side sod strips 17 and 18 to be rolled. When the tractor is in that position, the belt 61 is driven for a short period without the tractor moving forwardly so as to finish winding of the strips on the roller 45 located between the arms 47. When the winding is completed, the actuators 55 are operated to spread the arms 47 and pull the cones 46 out of the roller 45 carrying the two sod rolls. Thereafter, the actuating rod 90 is pulled upwardly to pivot the escapement 85 and cause the rear roller 45A in the magazine 80 to fall onto the rear end portions of the underlying sod strips. The tractor then is pulled forwardly to position the cones 46 in alinement with the roller 45A. Once the arms 47 have been moved toward one another to insert the cones into the roller 45A, the belt 61 is lowered and is driven by the motor 67 so as to start winding the strips around the roller. The tractor then is moved forwardly and, during such movement, the belt acts as before to assist in winding of the sod.

From the foregoing, it will be apparent that the present invention brings to the art a new and improved sod harvester 15 which is capable of cutting and rolling two side-by-side sod strips 17 and 18 at the same time. The power-assist unit 60 enables the strips to be wound into large-diameter rolls without manual starting while the magazine 80 and the escapement 85 avoid the need of the operator leaving the tractor 16 to load rollers 45 between the arms 46.

We claim:

1. A sod harvester for cutting strips of sod from the ground and for winding the strips into rolls, said harvester being adapted for attachment to a vehicle having a forward direction of travel, said harvester comprising means attachable to the front of the vehicle and adapted to cut the underlying sod into successive elongated strips and to slice the strips from the ground during forward travel of the vehicle, and means attachable to the rear of the vehicle for winding said strips into rolls, said winding means comprising a pair of transversely spaced arms, a roller located between said arms and supported to rotate about a transversely extending axis in proximity to the ground, a strip of said sod being wound in a roll around said roller as said vehicle travels forwardly, a power-operated assist on the rear of said vehicle and engageable with said sod to help wind said sod around said roller, said power-operated assist comprising a flexible endless belt extending generally tangentially of said roll in contact therewith, means for driving said belt in a direction such that the portion of the belt in contact with said roll moves upwardly and forwardly, an arm supporting said belt to pivot upwardly as the diameter of said roll increases, and a reciprocating hydraulic actuator connected to said arm and operable to pivot said arm downwardly to a position in which one end portion of said belt is in close proximity to said roller, said actuator being operable when actuated reversely to pivot said arm upwardly to a position in which said belt is generally horizontal.

2. A sod harvester as defined in claim 9 further including a magazine for storing a supply of rollers on said vehicle, said arms normally being disposed in active position supporting one roller for rotation about said transversely extending axis, means for moving said arms to inactive positions releasing said one roller, and selectively operable means for causing a roller to drop to the ground from said magazine and into position to be supported by said arms when said arms are next moved to said active positions.

3. A sod harvester as defined in claim 2 in which said magazine is a rack located beneath said vehicle and of sufficient size to hold several rollers which extend transversely of said vehicle, said rack sloping downwardly as it progresses rearwardly whereby said rollers tend to roll toward the rear of the rack.

4. A sod harvester as defined in claim 3 in which said selectively operable means include an escapement extending transversely of the rear end portion of said rack, means supporting said escapement for pivoting between first and second positions, said escapement being operable when in said first position to engage the rear roller in said rack and to hold said roller in said rack, said escapement being operable when in said second position to release the rear roller from the rack and to engage and hold the next roller in the rack.

5. A sod harvester as defined in claim 4 further including means accessible to the driver of the vehicle and operable when shifted manually to cause said escapement to move between said first and second positions.

6. A sod harvester as defined in claim 2 in which said arms are supported to move linearly and transversely between said active and inactive positions, said means for moving said arms to said inactive positions comprising a reciprocating hydraulic actuator means, said actuator means also being operable to move said arms to said active positions.

7. A sod harvester as defined in claim 1 in which said actuator also is operable to permit said arm to pivot upwardly automatically as the diameter of said roll increase.

8. A sod harvester for cutting strips of sod from the ground, said harvester comprising a cutterhead adapted for attachment to a vehicle having a forward direction of travel, said cutterhead comprising a blade unit having a pair of transversely spaced side blades and having a bottom blade extending transversely between said side blades, means for moving the blade unit of said cutterhead back and forth to cause the blades thereof to cut the sod into a strip and to slice the strip from the ground during forward travel of the vehicle, and inclined pivot means supporting said cutterhead for pivoting relative to said vehicle about an axis which slants downwardly upon progressing forwardly and which is inclined relative to the ground at an angle of between 20 and 40 degrees.

* * * * *